United States Patent [19]

Rizzo

[11] Patent Number: 4,821,655

[45] Date of Patent: Apr. 18, 1989

[54] LAWN SEEDING MACHINE

[76] Inventor: Salvatore J. Rizzo, 78 Arlington St., Meriden, Conn. 06450

[21] Appl. No.: 44,594

[22] Filed: Apr. 30, 1987

[51] Int. Cl.$^4$ .............................................. A01C 7/08
[52] U.S. Cl. .......................................... 111/8; 111/10; 111/130; 111/159
[58] Field of Search ...................................... 111/8–14, 111/85–88, 52–63, 64; 172/21, 22, 42, 43, 123, 240

[56] References Cited

U.S. PATENT DOCUMENTS

| | | |
|---|---|---|
| 768,763 | 8/1904 | Lee . |
| 1,808,759 | 6/1931 | Bickerton ................................ 111/1 |
| 2,022,354 | 11/1935 | Kirk ........................................ 111/1 |
| 2,026,460 | 12/1935 | Cobb ...................................... 275/2 |
| 2,577,775 | 12/1951 | Lemmon et al. ...................... 111/85 |
| 2,691,353 | 10/1954 | Secondo ................................ 111/52 |
| 2,748,986 | 6/1956 | Steel ....................................... 111/8 |
| 2,831,444 | 4/1958 | Schill ..................................... 111/52 |
| 2,876,013 | 3/1959 | Neff ....................................... 275/2 |
| 3,140,677 | 7/1964 | Fraser .................................... 111/8 |
| 3,160,123 | 12/1964 | Roquemore ........................... 111/1 |
| 3,175,522 | 3/1965 | Garber ................................. 172/240 |
| 3,247,812 | 4/1966 | Luciano ................................. 111/1 |
| 3,391,663 | 7/1968 | Cagle et al. .......................... 111/52 |
| 3,685,469 | 8/1972 | Rogers ................................... 172/21 |
| 4,084,522 | 4/1978 | Younger ................................ 111/14 |
| 4,090,456 | 5/1978 | Morrison, Jr. et al. .............. 111/3 |
| 4,117,893 | 10/1978 | Kinzenbaw ........................... 111/85 |
| 4,141,302 | 2/1979 | Morrison, Jr. et al. ............ 111/52 |
| 4,145,980 | 3/1979 | Boots .................................... 111/1 |
| 4,152,993 | 5/1979 | van der Lely ......................... 111/8 |
| 4,191,262 | 3/1980 | Sylvester ............................. 172/459 |
| 4,196,678 | 4/1980 | Lore et al. ............................ 111/10 |
| 4,267,783 | 5/1981 | Hendrix ................................ 111/52 |
| 4,273,057 | 6/1981 | Pollard ................................. 111/85 |
| 4,275,671 | 6/1981 | Baker .................................... 111/85 |
| 4,336,760 | 6/1982 | Cohen et al. .......................... 111/11 |

Primary Examiner—Robert A. Hafer
Assistant Examiner—Danton D. DeMille
Attorney, Agent, or Firm—Ira S. Dorman

[57] ABSTRACT

A machine for slicing and seeding a lawn includes a number of seed distributing discs which are arranged as a bank that is freely pivotable on a vertical axis, to automatically follow in grooves made by slicing blades mounted forwardly in the machine. Weight distribution, and the relationship between the axis of the bank of blades and the front wheels, contribute to the maneuverability and efficiency of operation of the machine.

17 Claims, 7 Drawing Sheets

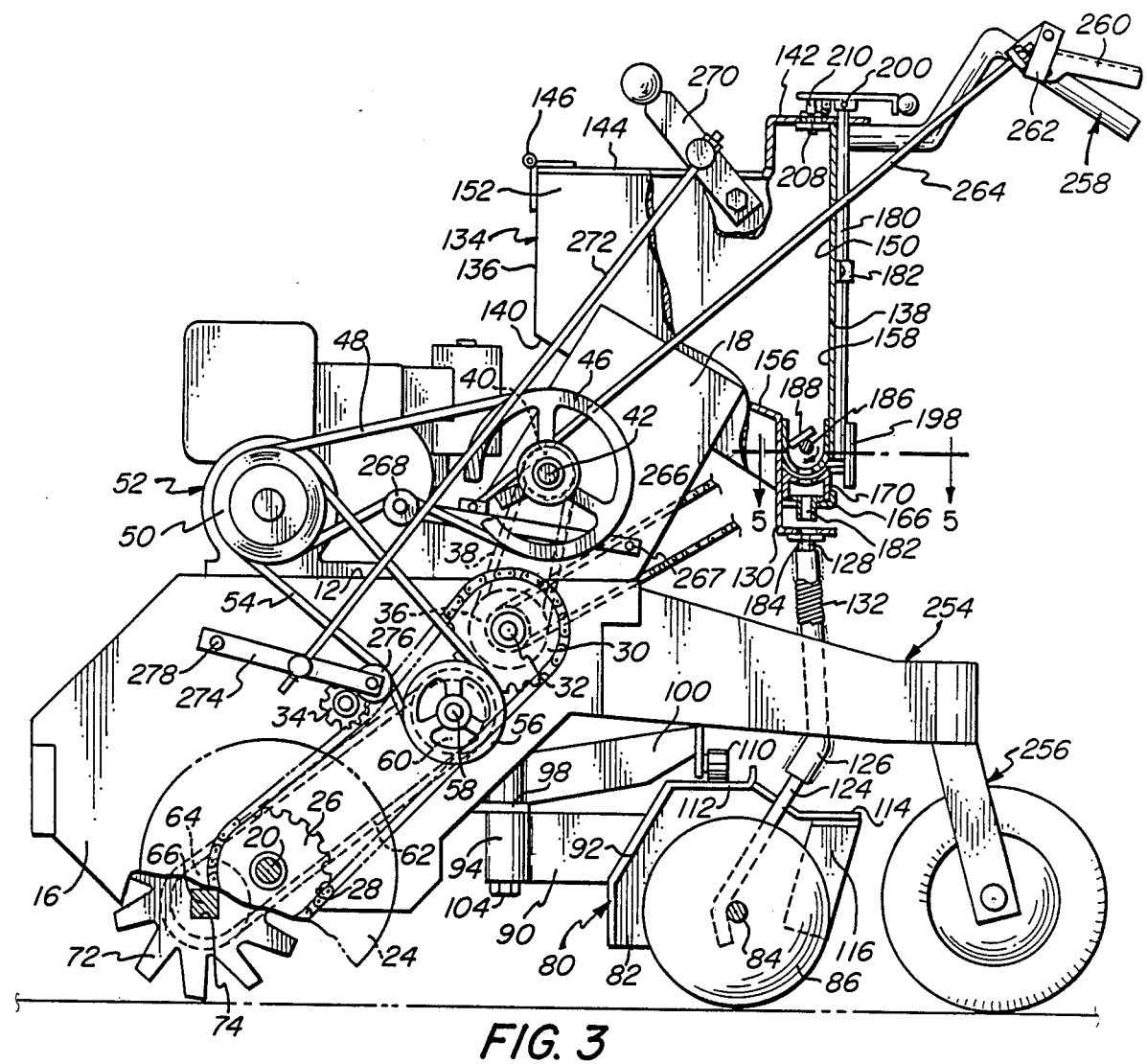

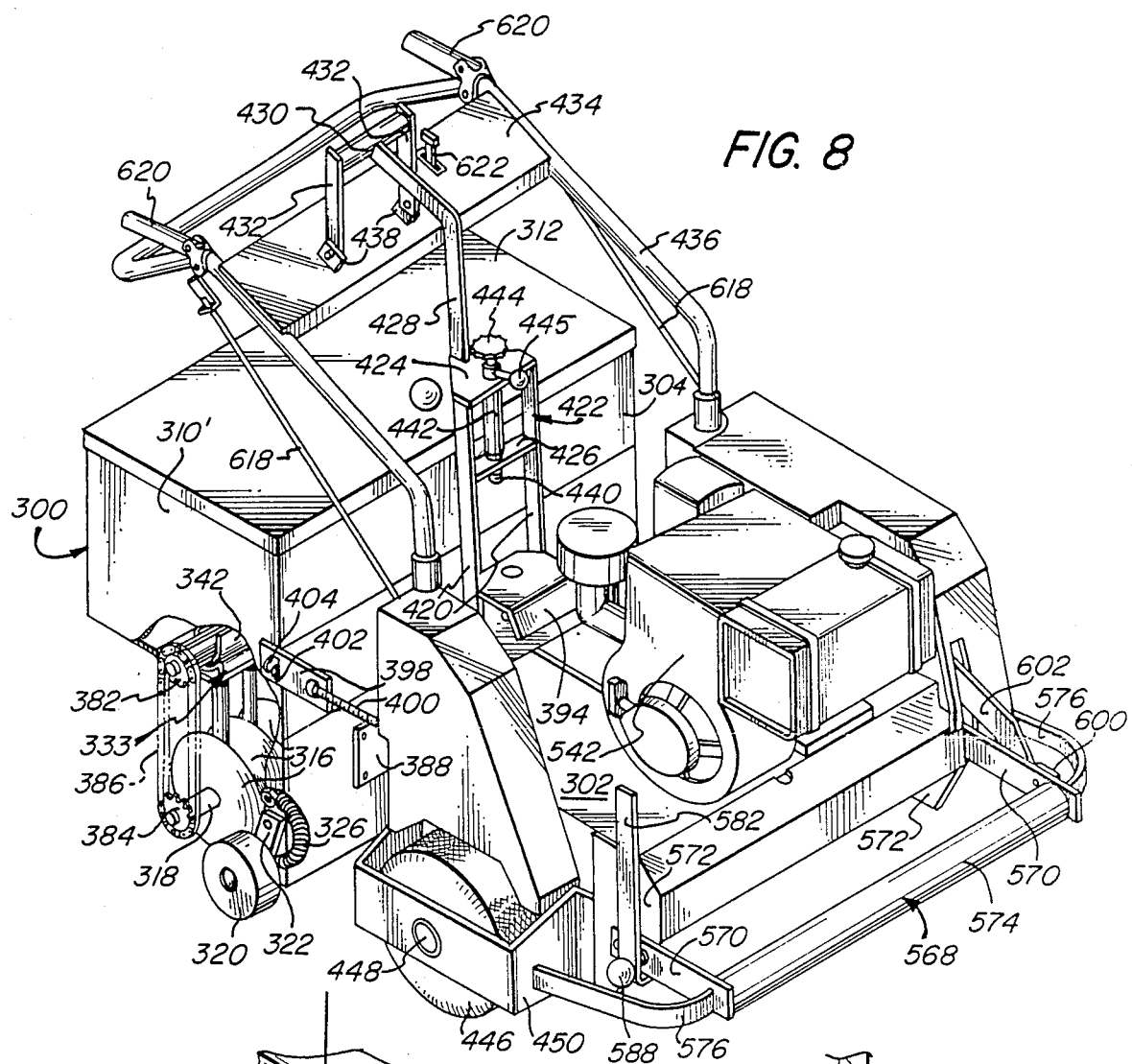
FIG. 8
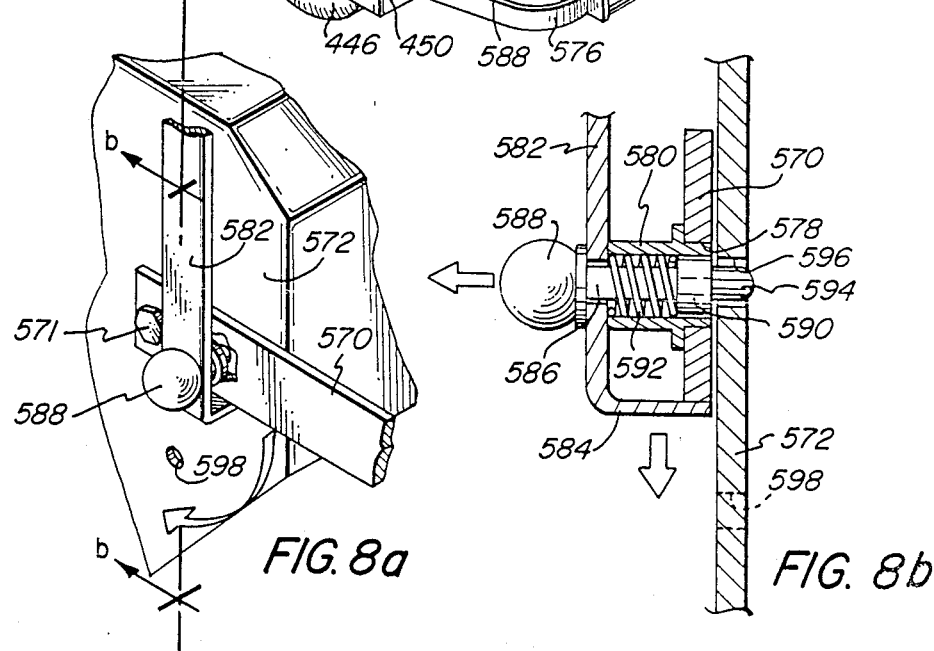
FIG. 8a
FIG. 8b

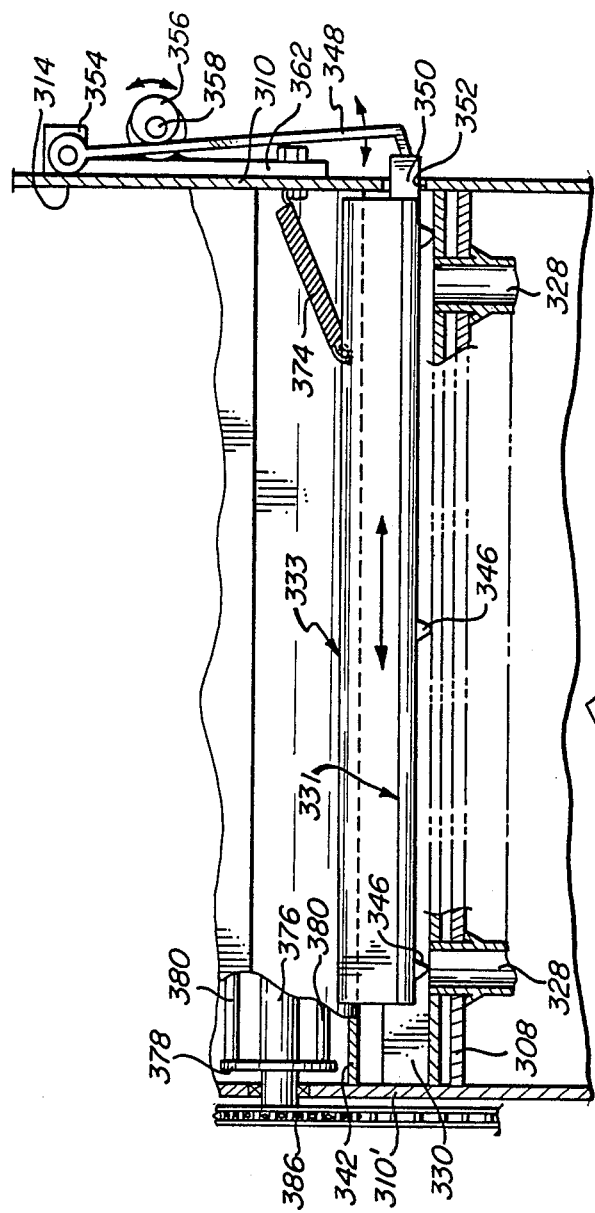
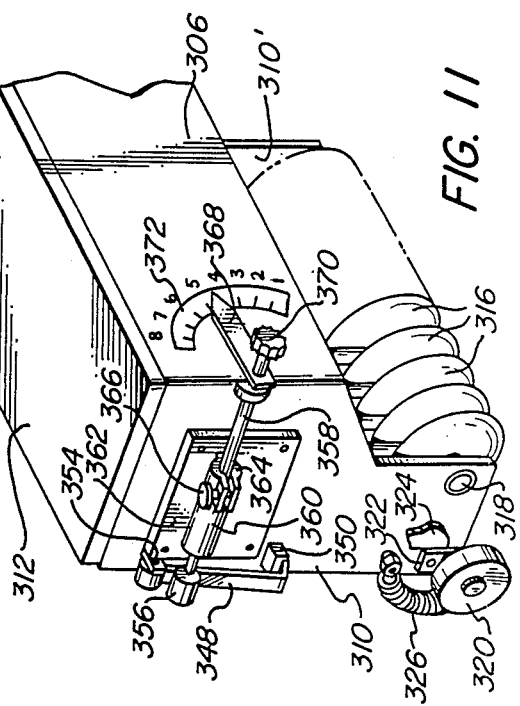
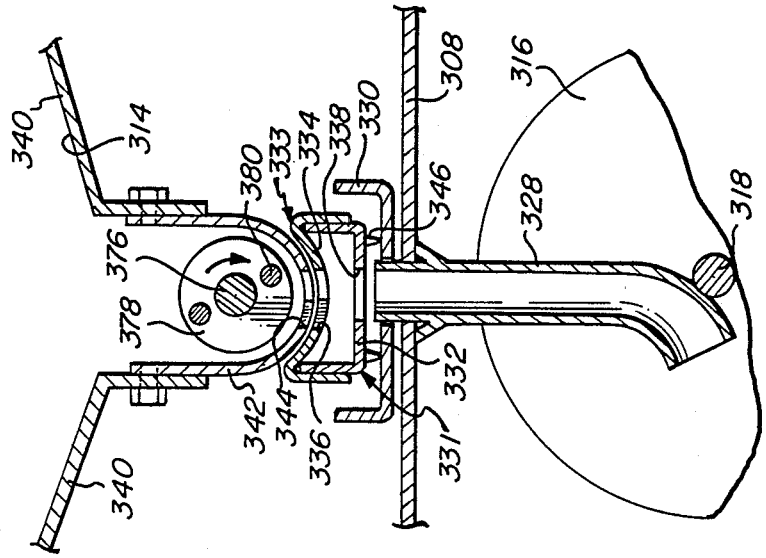
FIG. 13
FIG. 11
FIG. 12

LAWN SEEDING MACHINE

BACKGROUND OF THE INVENTION

Machines for preparing and thereafter seeding a tract of ground are old and well-known in the art, and in some instances power-driven lawn slicing and seed depositing machines have been provided. Exemplary of the prior art on the subject are the following U.S. patents:

In Fraser U.S. Pat. No. 3,140,677, a power-driven combination top dresser, spiker and planter is described having circular spiking elements disposed on the front wheel shaft.

Morrison, Jr. et al. U.S. Pat. Nos. 4,090,456 and 4,141,302 show an automatic seed planting mechanism in which the planter unit is pivotably connected so as to permit it to follow a curved path (see for example the disclosure in columns 6 and 7).

Boots U.S. Pat. No. 4,145,980 provides an automatic seeder in which furrow-forming disks are spaced two inches apart, and the use of flexible hoses to connect a seed hopper to delivery tubes or the like is disclosed in U.S. Pat. Nos. 2,691,353, to Secundo, 2,748,986 to Younger and 4,084,522 to Steel.

Cohen et al. U.S. Pat. No. 4,336,760 discloses earth working apparatus in which the rear "dolly" wheel is pivotable.

Despite the level of activity in the art indicated by the foregoing, the need remains for a relatively compact, power-driven lawn seeding machine which is highly maneuverable and efficient in its operation, and it is therefore a broad object of the present invention to provide a novel machine having those characteristics.

More specific objects of the invention are to provide such a machine that is capable of functioning as an all-terrain slicer/seeder, which can turn on relatively small radii and can plant a lawn effectively in single-pass operation, covering a relatively wide swath and despite steep inclines.

Another object is to provide a novel self-contained seed delivery unit suitable for use as a trailer for a lawn slicing machine.

SUMMARY OF THE INVENTION

It has now been found that certain of the foregoing and related objects of the invention are readily attained by the provision of the power-operated lawn seeding machine disclosed. It comprises a chassis with laterally spaced, ground-engaging wheels disposed adjacent its opposite sides, an engine mounted on the chassis in substantial vertical alignment above the wheels, and first means for operatively connecting the engine to the wheels. The machine also includes a multiplicity of rotary cutting or slicing blades, arranged as a bank in side-by-side spaced relationship for rotation on a common axis and operatively connected to the engine for driven rotation, second means for operatively connecting the engine for driving the bank of blades, means mounting the bank of blades on the chassis with the axis thereof in parallel alignment with the axis between the wheels, and means for selectively adjusting the elevation of the blade mounting means. The blades are movable between an elevated position, in which they are substantially above ground level, and a lowered position for cutting, and the blade bank axis is in substantial vertical alignment under the wheel axis in the lowered position of the mounting means. Handle structure is disposed on the chassis rearwardly of the wheels and in an elevated position, and seed delivery means is mounted on the chassis rearwardly of the wheels, in general alignment under the handle structure and for free pivotal movement about a generally vertical axis. The delivery means comprises a bank of discs mounted in side-by-side, spaced relationship for rotation on a common axis; the number and spacing of the discs is the same as the number and spacing of the blades, and the pivotable mounting adapts the delivery means for ground-contacting and automatic tracking engagement of the discs in grooves cut by the blades.

The blade bank mounting means will normally be pivotably mounted for movement about an axis parallel to the wheel axis, in which case the "second" connecting means will include a drive member that rotates on the axis of pivoting of the blade bank mounting means. Preferably, the blades will be equidistantly spaced from one another, on about two-inch centers.

The machine will normally also include seed supply means operatively connected to the delivery means. In one embodiment, the supply means and the delivery means will be integrated as an assembly, which will generally employ a common housing that is pivotably connected to the chassis and is disposed under the handle structure. The seed supply means will usually comprise a hopper for holding a volume of seed, and a multiplicity of conduits connected thereto for delivering seed to each of the discs. In some instances, the hopper will be fixedly mounted on the chassis, and each of the conduits may comprise a flexible hose extending from one of a multiplicity of outlet openings from the hopper, to a location adjacent one of the discs to define a seed flow path.

The seed supply means of the machine will most advantageously incorporate metering means for controlling the rate of flow of seed. In one desirable form, the metering means will comprise a pair of superposed plates spanning the hopper at a level above the openings, and defining an overlying supply chamber. The plates will have a multiplicity of apertures disposed in general registry with one another to cooperatively define a multiplicity of passages, and the plates will be laterally shiftable in a relative sense, to vary the degree of registry of the apertures and thereby the size of the passages, thus controlling the flow of seed from the supply chamber. Generally, the number of the passages will be the same as of the number of openings, and the passages and openings will be vertically aligned.

In certain embodiments, the machine will additionally include means for mounting the bank of discs for movement between elevated and lowered positions, to dispose them substantially above and below ground level, respectively. The selective adjusting means provided for the blades will preferably serve to simultaneously selectively adjust the elevation of the disc mounting means, and the mounting means for the discs will normally be pivotably mounted for movement about an axis parallel to the wheel axis.

BRIEF DESCRIPTION OF THE DRAWINGS

FIG. 3 is an elevational view of the machine taken from the right side as shown in FIG. 1, in partial section and with portions broken away;

FIG. 4 is a fragmentary exploded view of the metering mechanism employed in the machine for controlling the flow of seed;

FIG. 5 is a section view taken along line 5—5 of FIG. 3, showing the metering mechanism of FIG. 4 with the parts in assembly;

FIG. 8 is a perspective view of a second embodiment of the machine of the invention, with a sidewall portion of the housing of the seed delivery unit broken away to show internal features;

FIG. 8a is a fragmentary perspective view of the right front portion of the machine, drawn to an enlarged scale;

FIG. 8b is a sectional view taken along line b—b of FIG. 8a and drawn to a further enlarged scale;

FIG. 11 is a fragmentary, rear perspective view of a seed delivery unit of the machine of FIG. 8;

FIG. 12 is a fragmentary vertical sectional view of a lower portion of the unit of FIG. 11, drawn to an enlarged scale and taken in a plane normal to the axis of the disc bank; and FIG. 13 is a fragmentary vertical sectional view of an intermediate portion of the unit, taken in a laterally extending plane and drawn to the scale of FIG. 12.

DETAILED DESCRIPTION OF THE ILLUSTRATED EMBODIMENTS

Figure 1:
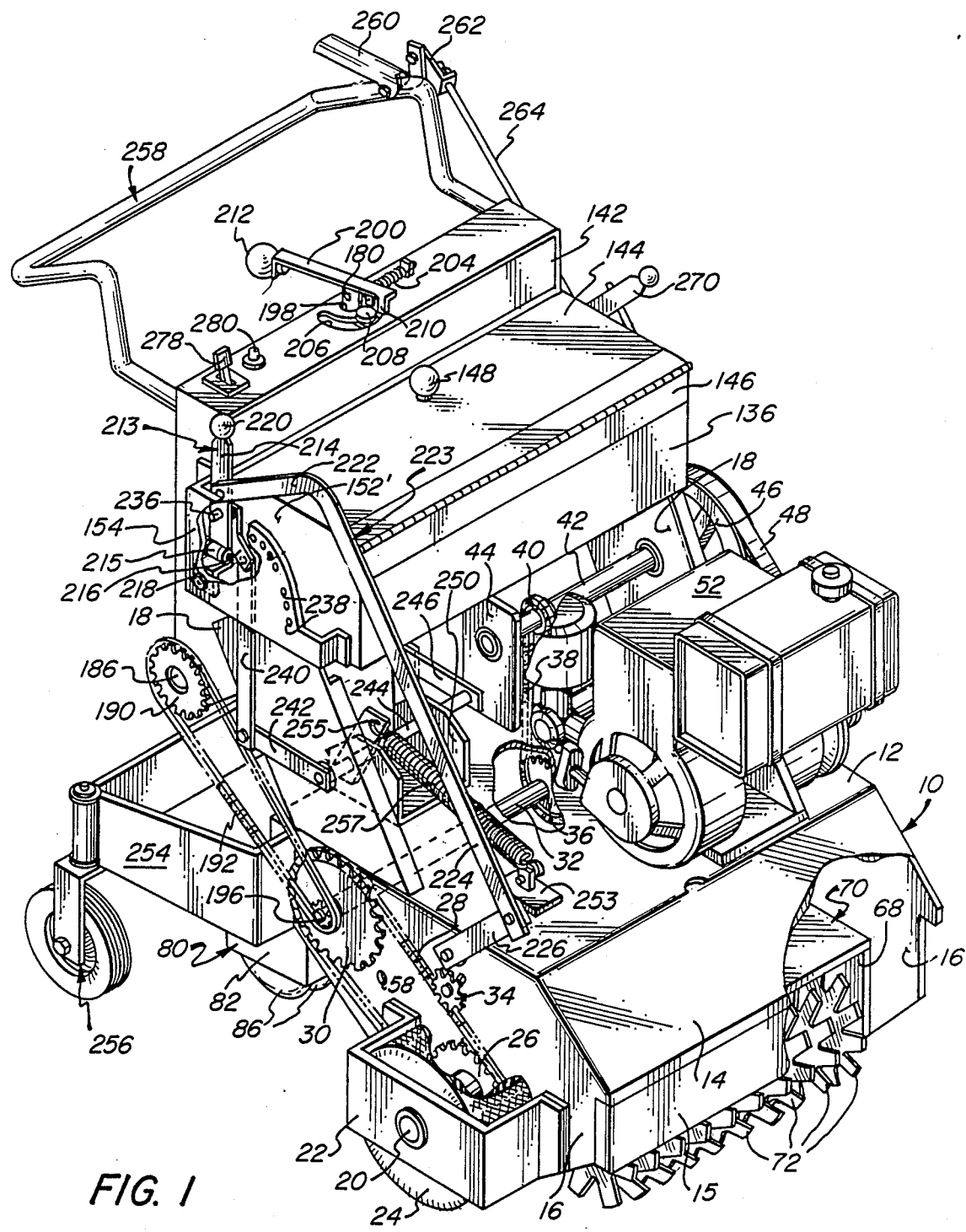
FIG. 1 is a perspective view of a lawn seeding machine embodying the present invention, with portions broken away to expose internal features.
Figure 2:
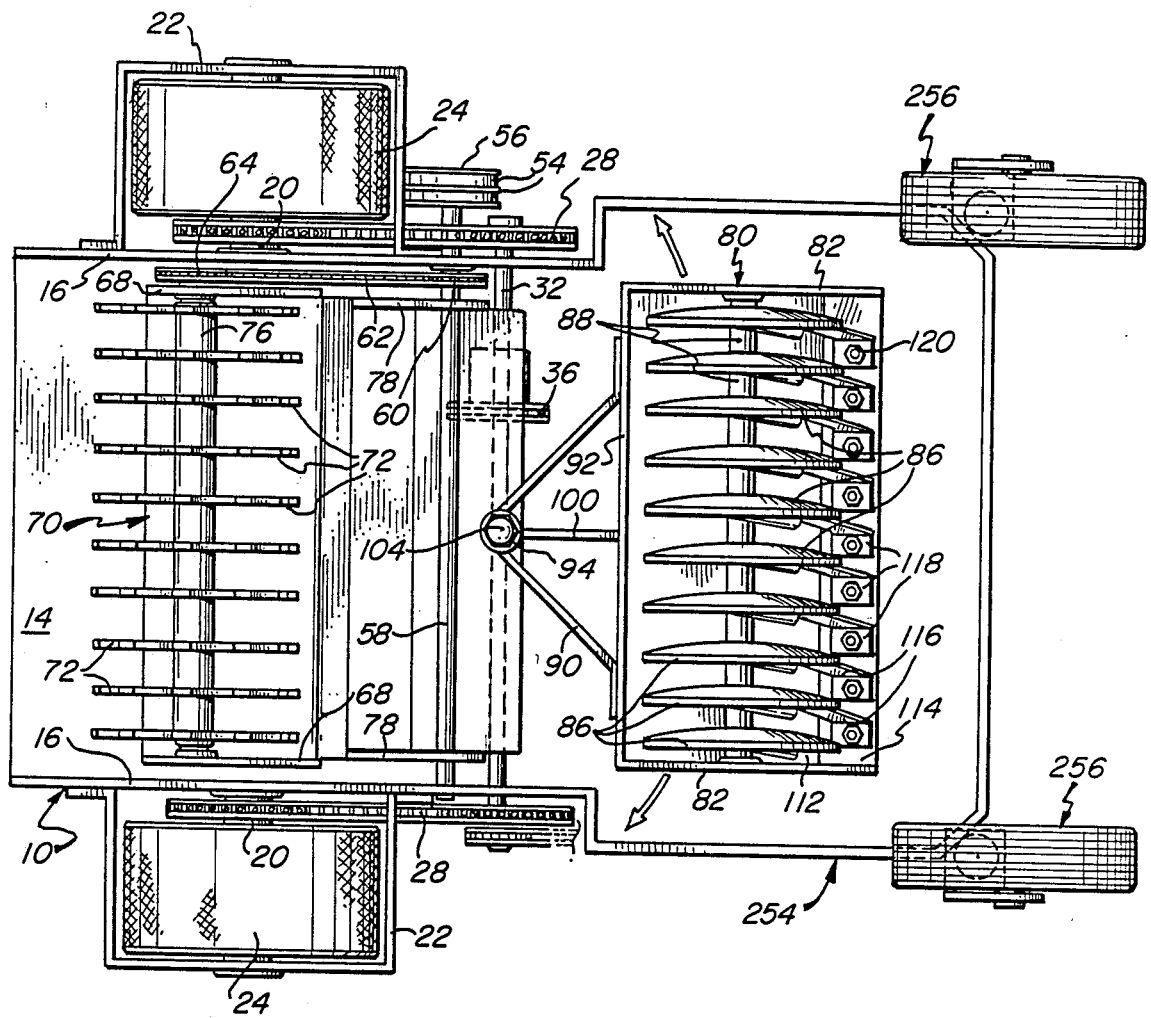
FIG. 2 is a bottom view of the machine of FIG. 1.

Referring to FIG. 1-7 of the drawings initially, the machine illustrated includes a chassis, generally designated by the numeral 10, having a deck portion 12, an inclined front wall portion 14, a removable panel 15 therebelow, sidewall portions 16, and upwardly extending angled bracket portions 18. One of a pair of stub axles 20 is journaled between each sidewall portion 16 and a box-like frame piece 22 attached to it, and each axle 20 supports an affixed ground-engaging wheel 24 and gear 26. The gears are independently connected by drive chains 28 to sprockets 30 on each side of the machine, the sprockets being affixed on the opposite ends of a main drive shaft 32 which is, in turn, journaled between the sidewall portions 16 of the chassis. An idler pinion 34 is adjustably mounted (by means not shown) in a slot formed through each wall portion 16, to enable proper tension to be maintained on the drive chains 28.

The drive shaft 32 carries a gear 36 in a centralized position, and it is driven by chain 38, which is in meshing engagement with gear 40; gear 36 is attached to a differential, which allows portions of shaft 32 and the sprockets 30 thereon to rotate at different speeds when the machine is turning a corner. The gear 40 is affixed to shaft 42, which extends partially across the machine, and is journaled at its opposite ends in one of the angled brace portions 18 and in a bracket 44 which projects upwardly from the deck portion 12. A wheel 46 of relatively large diameter is affixed on the outer end of the shaft 42, and receives a drive belt 48, which engages one section of a compound pulley 50 on the end of the shaft of the engine, generally designated by the numeral 52. The engine is supported on the deck portion 12, and has an associated gasoline tank and other parts that are conventional for an internal combustion engine system of the type commonly used for self-propelled machines of this kind.

A pair of drive belts 54 engage a second section of the compound pulley 50, and connect the engine 52 to a double sheave 56 on one end of another drive shaft 58. The shaft 58 spans the chassis and is rotatably mounted upon the sidewall portions 16, and a drive gear 60 is affixed inwardly of one end. A chain 62 meshes with the gear 60 and a pinion 64 on the shaft 66; the ends of the shaft 66 are journaled within the side plate portions 68 of a cutter blade assembly housing, generally designated by the numeral 70, which is disposed within the forward portion of the chassis 10.

Ten rotary slicing blades 72 are mounted side-by-side on the square shaft 66. Each has a square central opening 74 by which it is engaged against relative rotation on the shaft 66, and a spacer 76 is interposed between each pair of adjacent blades 72 to fix them in position along the length of the shaft. Two laterally spaced bracket arms 78 extend rearwardly from the housing 70, and each has a circular indentation (not visible) formed into its outer end, within which the shaft 58 is seated to pivotably mount the cutter blade assembly for movement about its axis; since chain 62 is driven from the same shaft 58, changes in the position of the blade assembly can readily be made with no effect upon the power delivered to it from the engine.

A second housing, generally designated by the numeral 80, includes end plate portions 82, within which shaft 84 is journaled. A bank of ten discs 86 are mounted upon the shaft 84, and are maintained in spaced relationship by a series of spacers 88; the distance between the discs 86 is the same as that between the cutter blades 72 and, in the preferred embodiments of the invention, is about two inches on centers. A right-angle frame piece 90 is attached to a forward wall portion 92 of the housing 80, and has a bearing sleeve portion 94 at its apex.

A bracket 96, having a laterally-extending flange 98, is pivotably mounted upon the shaft 58; the sleeve portion 94 of the frame piece 90 is disposed beneath the flange of the bracket 96, and an operating arm 100 is positioned on top of it. The arm 100 has a cylindrical post 102 at one end, which extends at an obtuse angle therefrom and passes downwardly through an aperture (not visible) in the flange 98 and into the passageway of the sleeve portion 94, the assembly being secured by a bolt 104 which extends upwardly into the post 102 and is threadably engaged therewithin. As will be appreciated, the arrangement provided permits pivoting of the housing 80 about both a horizontal axis (of the shaft 58) and also a vertical axis (of the post 102).

The rearward end of the arm 100 is formed with a lateral flange 106, through which extends a nut and bolt fastener 108, which in turn mounts a roller 110. The roller bears upon the top wall portion 112 of the housing 80, and constrains it against deflection relative to the arm 100. This prevents binding of the bearing sleeve portion 94 on the post 102, and ensures free pivoting of the housing 80 and the bank of discs 86 thereabout in a horizontal plane (as indicated by the arrows in FIG. 2).

The housing 80 has an angled rack 114 extending along its rearward edge, on which are mounted ten scraper blades 116. The blades are generally L-shaped, and are configured so that the longer leg 116 bears upon the surface of one of the discs 86 when the shorter leg 118 is secured in place by the nut and bolt fastener 120. A coil spring 122 on the shaft of the bolt bears upon the leg 118, and exerts a biasing force for holding the longer leg 116 against the associated disc 86 while permitting it to resiliently deflect, to most effectively perform its function.

The rack 114 also supports ten tubular nozzles 124, which are disposed at equidistantly spaced locations to position one of them alongside each of the discs 86. A flexible tube 126 is attached to the upper end of each nozzle 124, and is in turn engaged upon a nipple 128 supported by an L-shaped bracket portion 130 on the chassis of the machine; a wire coil 132 (see FIG. 3) extends about each tube 126 and is (although not so illustrated) substantially coextensive therewith; the coils 132 serve to permit the tubes to freely move and vibrate while, at the same time, protecting them against damage.

A seed supply hopper, generally designated by the numeral 134, is mounted on the angle bracket portions 18 of the chassis to dispose it upwardly and near the back of the machine. The hopper consists of a housing having a front wall portion 136, a rear wall portion 138, a bottom wall portion 140, a top portion 142, and sidewall portions 152, 152', the latter having a mounting bracket 154 affixed to it. A cover 144 is mounted by a hinge 146 on the front wall portion 136, and may be opened by use of the knob-like handle 148 to provide access to the hopper chamber 150. An internal inclined floor portion 156 connects to the L-shaped portion 130, defining therewith, and with the back and sidewalls 138, 152, 152', a well section 158 at the bottom rear of the hopper.

A U-shaped trough piece 160 spans the well section 158 and is attached to the back wall portion 138 of the housing by suitable fasteners 162. As best seen in FIG. 5, the bottom of the trough piece 160 has a series of ten longitudinally aligned and equidistantly spaced diamond-shaped apertures 164 formed through it. A ledge portion 166 extends rearwardly and laterally from the portion 130 under the piece 160, and slidably seats a bridge-like throttle plate 168, which has a downwardly curved upper wall 170 conforming substantially to the curved bottom of the trough 160 and disposed in nested contact with it. A corresponding series of ten diamond-shaped apertures 172 are formed through the upper wall 170, and are in substantial underlying alignment with the apertures 164 when the member 160 is disposed as illustrated in FIGS. 3 and 5; because their size and positions are the same, the apertures 164 and 172 cooperate to define passages from the well section 158, the effective area of which depends upon the relative positions of the two components, and the extent of overlap of their apertures.

A rearwardly extending flange 174, having a U-shaped indentation 176 formed into it, is attached to the throttle plate 168 at a central location. It receives the short cylindrical section 178 of an operating member, which also includes a rod 180 to which the section 178 is affixed in an offset, eccentric relationship. The rod 180 extends vertically along the rear wall portion 138 of the hopper housing, and is rotatably mounted thereon by a U-shaped strap 182 which is affixed to the wall portion. As will be appreciated, rotation of the rod 180 about its axis will cause the cylindrical section 178 to circumscribe an arc of small radius, which will in turn effect longitudinal shifting of the plate 168 (through the coupling with the projecting flange 174) to control the flow of seed from the chamber 150. Thus, the seed will move at a selected flow rate through the apertures 164, 172 (depending upon the amount of their overlap) and thereafter into the nozzles 182, which are supported by the shelf piece 166 in alignment beneath each of the passages (only one such nozzle being shown in FIG. 3). The seed falls through apertures 184 in the L-shaped portion 130 and the associated nipples 128, ultimately to flow through the tubes 126 and to pass from the nozzles 124 along the associated discs 86, to be deposited into the ground.

To promote flow of seed and avoid agglomeration and clogging, an agitator is provided within the well section 158 of the hopper. It consists of a laterally extending rod 186, having a series of paddle elements 188 affixed at spaced locations along its length. The outer end of the rod 186 carries a gear 190, which is connected by a chain 192 to the pinion 196, which is mounted on the drive shaft 32 outwardly of the gear 30. Consequently, the agitator rod 186 will be rotated when the engine 52 is operatively connected to the shaft 32, to promote flow of seed from the hopper, in the manner described.

The top portion 142 of the hopper housing has an aperture 198, through which extends the upper end of the rod 180. A handle lever 200 is pinned to the protruding end of the rod for pivotable movement about a diametrical axis, and it is biased by the spring 202 in such a way as to urge the throttle plate 168 of the metering arrangement toward a closed condition of the passages when the lever 200 is not restrained. An arcuate slot 206 is formed through the top portion 142, within which is engaged a stop piece 208 having a projecting head and an element within the housing for clamping the stop in any selected position along the length of the slot 206. The depending tab 210 on the lever 200 is disposed to contact the stop piece 208 under the normal biasing force of the spring 204, to prevent closure of the passages in the metering assembly and thereby establish the passages (the areas of which can be varied by altering the position of the piece 208). Changes of flow rate can be effected manually, and interference with the stop 208 by can be avoided by applying downward force to the spherical knob 212 on the end of the handle to elevate the tab 210.

A Y-shaped elevator handle, generally designated by the numeral 213, consists of a relatively long arm 214 and a relatively short arm 216 angled therefrom, with a knob 220 attached to the upper end; the handle is pivotably mounted, by a nut and bolt fastener 218, to the bracket 154. The shorter leg 222 of an L-shaped bar, generally designated by the numeral 223, is pivotably attached to the arm 214, and the longer leg 224 thereof is similarly attached to the outer arm 226 of a pivot mount subassembly. The subassembly includes an inner arm 228 rigidly affixed to arm 226 by a shaft 230, which extends through a hole in the side portion 16 of the chassis, and it is supported by a bracket (not shown) attached to the underside of the deck portion 12. A pair of links 232 (only one of which is visible) are pivotably connected at their opposite ends to the inner arm 228 and to a flange 234, which projects from the top wall portion of the cutter blade housing 70.

Figure 6:
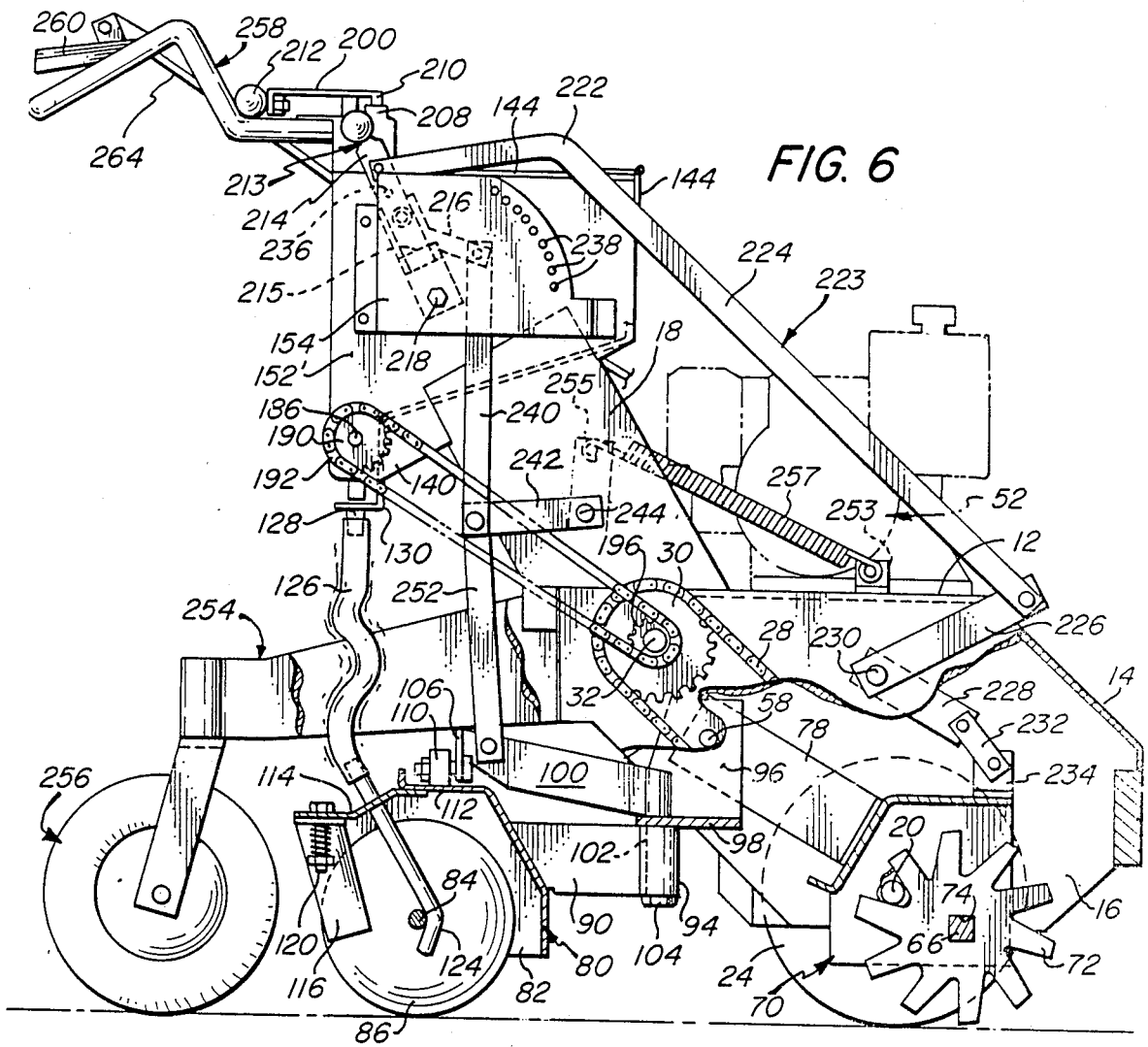
FIG. 6 is an elevational view of the machine taken from the left side as it is shown in FIG. 1, with parts broken away and with the engine system shown in phantom line.
Figure 7:
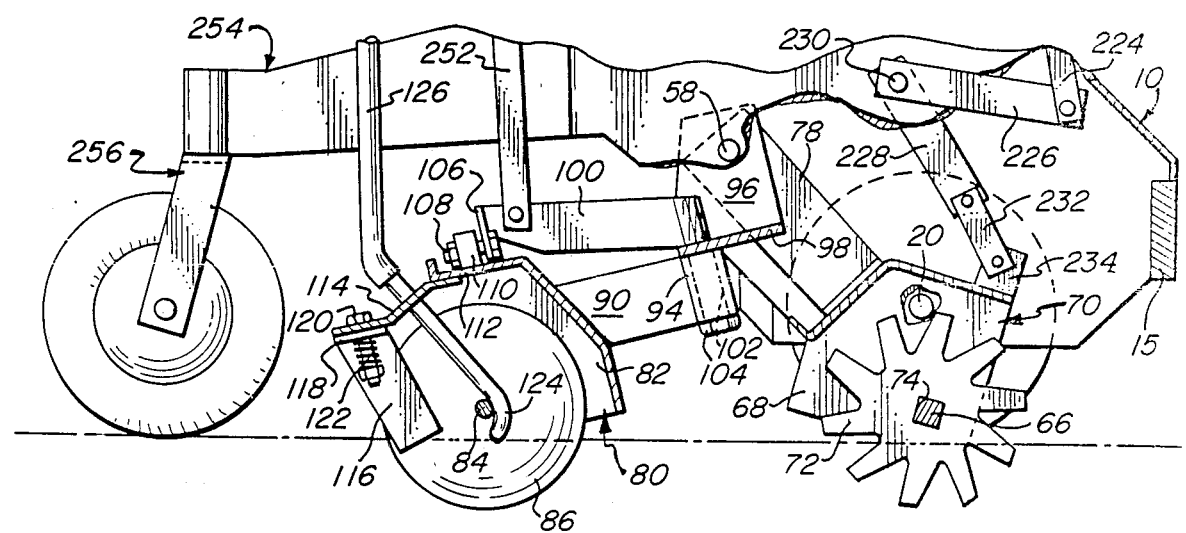
FIG. 7 is a fragmentary view of the machine, as shown in FIG. 6 but with the slicing blades and seed-depositing discs in lowered, operative positions.

As will be appreciated, clockwise movement of the elevator handle 213 from the position shown in FIGS. 1 and 6 will permit the housing 70 (and in turn the cutter blades 72) to swing downwardly, acting through the L-shaped bar 223 and the attached linkages, to the operative position shown in FIG. 7. The level to which the blades are lowered (and hence, the depth of penetration into the ground) can be changed by insertion of the pin 236 on the arm 214 into a different one of the arcuately arranged series of apertures 238 in the bracket 154; the handle 213 is hinged at 215 to facilitate the lateral movement required.

The shorter arm 216 of the handle 213 is pivotably connected to one end of a link 240, which is in turn pivotably connected at its opposite end to one arm 242 of a second pivot mount subassembly, which also includes an inner arm 246 attached by a rod 244, which extends through a hole 245 in the portion 18 and is supported by a U-shaped bracket 250 mounted upon the deck portion 12. The inner arm 246 is pivotally attached to a pair of a links 252, the opposite ends of which are connected to the arm 100. Consequently, the same handle 213 that controls the position of the cutter blades 72 also controls the level at which the discs 86 are disposed; clockwise pivoting (from the position of FIGS. 1 and 6 to that of FIG. 7) will lower the housing 80 and thereby bring the discs and cutter blades to substantially the same level.

A counterbalance subassembly includes a bracket 253 mounted upon the deck portion 12, a third arm 255 attached to the rod 244, and a fairly heavy coil spring 257. The spring exerts a clockwise force on the rod, tending to elevate the banks of blades and discs, and thereby facilitating lifting by the operator.

A box-frame member, generally designated by the numeral 254, is attached to the chassis at the lower rear of the machine, and serves to support a pair of castor wheels, each generally designated by the numeral 256. One wheel is disposed at each of the two outermost corners of the box frame member 254 to cooperate with the wheels 24 in supporting the machine, and they also relieve the weight upon the bank of discs 86. Consequently, when the machine is propelled across the ground the discs 86 will engage within the grooves or furrows cut by the blades 72, freely tracking them and imposing no constraint upon the ability of the machine to turn about corners and to follow the topography of the terrain over which it is operated.

The same advantages are promoted by the relationship between the axis of rotation of the cutter blades 72 and of the wheels 24 at the front of the machine. As is best seen in FIG. 7, in operative position the axis of the shaft 66 on which the cutter blades 72 are mounted is aligned in a substantially vertical plane beneath the axis of the wheel axles 20. The blades therefore impose only a minimum amount of resistance to turning of the machine. That would not be the case if, for example, the axis of the shaft 66 were substantially ahead of or behind the wheels 24, since multiple points of contact, displaced from one another along the longitudinal axis of the machine, would thereby be presented. It will be recognized that the position of the shaft 66, relative to the true vertical plane of the axles 20, will deviate somewhat depending upon the level at which the cutter blades are adjusted to operate, because of the pivotal mounting. The machine is of course designed for use with an operator walking behind it and holding the handle 258; it is important therefore that the seed hopper, distributor discs, and castor wheels be located sufficiently forwardly to be out of the way.

A squeeze-type lever grip 260 is pivotably attached to the handle 258, and it has a bracket 262 to which one end of an operating tie-rod 264 is attached. The opposite end of the rod 264 is pivotably connected to an arm 266 at an intermediate location along its length, which in turn is pivotably mounted at 267 upon the angle bracket portion 18 and extends forwardly therefrom; a small pulley 268 is rotatably mounted on the free end of the arm 266, and rides upon the drive belt 48 which connects the engine 52 to the larger wheel 46. When properly adjusted, the belt 48 is sufficiently loose that there will be slippage on the associated pulleys; that is the condition shown in FIG. 3. By applying pressure to the grip 260 the arm 266 will be pivoted upwardly, thereby applying sufficient tension to the belt 48 to render the engine 52 effective to rotate the wheel 46, and in turn to drive the components operatively connected to it.

A similar clutch mechanism is provided for the belts 54, and consists of the lever 270, the tie-rod 272, the pivoted arm 274 and the pulley 276. It will be evident that pulling the handle 270 upwardly (clockwise) from the position shown in FIG. 3 will elevate the arm 274 about its pivot 278, causing the pulley 276 to tighten the belts 54 and thereby transmit power from the engine 52 operative to drive the wheel 56.

Thus, by squeezing the grip 260 the wheels 24 will be engaged to drive the machine forwardly, and the agitator for the seed will simultaneously be activated; throwing the lever 270 will cause the cutter blades to rotate. The machine is provided with a conventional throttle mechanism (not shown) to control its ground speed, which is operated by the small lever 278 on the top wall 142, and the button 280 next to it is a "kill" switch, which is pushed to stop the engine.

When the machine is operated over the ground, the slicing blades 72 produce ten parallel grooves. The discs 86 ride in them and serve to guide seed, fed by gravity from the hopper 134 thereonto from the nozzles 124, to the bottom of the furrows. Because of the close spacing that is possible between the blades and discs (in a lateral sense) it is possible with the machine of the invention to seed lawn in a single pass, without need for "cross-cutting" and seeding, which has heretofore been necessary with prior art machines of the same general type. As indicated, moreover, the high degree of maneuverability afforded by the design of the machine enables it to turn on relatively small radii (typically about 25 inches), regardless of whether the machine is on flat or relatively steep terrain. The location of the engine over the bank of blades ensures that sufficient weight will be exerted to slice the ground effectively while at the same time leaving the gang of discs free to pivot and readily follow the grooves, without inhibiting the sharp turning action that is desired.

Turning now in detail to FIGS. 8-13 of the drawings, therein illustrated is a second embodiment of the machine of the invention, in which the seed supply means and delivery means are integrated as a seed depositing assembly within a common housing, generally designated by the numeral 300. The housing is pivotably connected to the machine chassis, generally designated by the numeral 302, and consists of front wall 304, a rear wall 306, a lower wall 308 and side walls 310, 310'; a cover 312 is connected (by means not shown) at the top of the housing to enclose the seed chamber 314 defined therewithin.

A bank of depositing discs 316 are rotatably mounted upon a common axle 318 which extends between the sidewalls 310, 310' at the bottom, rear of the housing, and a small wheel 320 is rotatably mounted upon a plate 322 which is pivotably attached at the forward bottom corner of each sidewall. The wheels 320 are movable between inoperative (elevated) positions (shown in FIG. 10) and operative (lowered) positions (FIGS. 8, 9 and 11) in which the mounting plates 322 abut against bosses 324 protruding from the sidewalls of the housing; the wheels 320 are urged to their inoperative positions by the springs 326, and are maintained in ground engagement by virtue of the over-center relationship shown in FIG. 9. As will be noted, the wheels 320 are used to raise the seeding unit, and thereby elevate the discs 316 above ground level.

A set of rigid nozzles 328 (one for each disc 316) are supported in the lower wall 308, and are disposed to open at locations alongside the associated disc. The upper ends of the nozzles 328 extend through an elongated, U-shaped slide plate 330 mounted within the housing, which in turn supports an elongated metering device comprised of a base piece and a cover piece, generally designated respectively by the numerals 331 and 333 and assembled with one another. The downwardly curved top wall 334 of the cover piece 333 has a series of apertures 336 extending along its length (one for each nozzle 338), and the bottom wall 332 of the base piece 331 is slotted at 338 to permit passage of seed through the assembly.

The lower end of the hopper chamber 314 is defined by wall portions 340 which slope inwardly toward one another and which mount a U-shaped trough piece 342, which extends laterally across the housing 300. A set of apertures 344, equal in number to apertures 336, extends longitudinally along the bottom of the trough piece 342. The apertures 336, 344, like those shown in the metering components illustrated in FIGS. 4 and 5 of the previous embodiment, are diamond-shaped and cooperate in the same manner to serve a throttling function when the metering device is shifted laterally relative to the trough piece 342. Such movement is facilitated by the provision of the small contact legs 346 on the bottom wall 332, and is accomplished by adjustment of arm 348.

The arm is pivotably mounted at one end upon a tab 354 which extends from the plate 362 on sidewall 310, and is acted upon by the roller 356, eccentrically mounted upon one end of a shaft 358. The shaft is rotatably supported by a sleeve 360 on the mounting plate 362, and a split collar 364 encircles the shaft 358 and is clamped thereupon by adjustment of the screw 366. The opposite end of the shaft 358 carries a pointer 368, which cooperates with a scale 372 on the rear wall 306 of the housing, and an adjustment knob 370. As will be appreciated, rotation of the shaft 358 will cause the eccentric roller 356 to cam the arm 348 inwardly, acting through the finger portion 349 and the lug 350 that protrudes through the wall aperture 352, to thereby shift the metering assembly against the counteracting force of the coil spring 374; this will of course vary the effective area of the passages defined cooperatively by the apertures 336, 334 and will, in turn, control the flow of seed from the hopper chamber 314.

An agitator assembly, consisting of a center shaft 376, a pair of end discs 378 (only one of which is visible) mounted thereon, and a pair of laterally extending rods 380 supported between the discs 378, is rotatably disposed within the trough piece 342. A pinion 382 is affixed to the shaft 376 outwardly of the wall 310', and it is in meshing engagement, through the chain 386, with the pinion 384 on the shaft 318 that supports the bank of discs 316; rotation of the discs will thereby cause the agitator assembly to revolve, thus ensuring proper flow of seed from the hopper.

The housing 300 has a bracket 388 that extends forwardly from the wall 304, which supports a bearing 390 in which is received the pivot post 392, which depends vertically from the mounting bracket 394 on the chassis 302. Consequently, the housing 300 is freely pivotable with respect to the chassis, and the discs 316 can readily follow in furrows cut by the rotary blades 396 mounted on the chassis 302 (in much the same manner as are the blades 72 of the prior embodiment, but which will be described in greater detail hereinbelow). Under some circumstances, it may be desirable to restrain the housing against pivoting; the latching arrangement, consisting of the plate 398 and fastener 400, are provided for that purpose. The fastener adjustably connects the plate 398 to the chassis, and the plate is slotted at 402 to receive a finger 404 on the housing. It is obvious that the seed delivery unit is released for pivoting simply by unlatching the plate 398 from the finger 404.

As in the prior embodiment, the chassis 302 is provided with a bank of slicing blades 398 mounted upon a common shaft 406 which is, in turn, supported by a housing, generally designated by the numeral 408; here again, the number of blades and discs will normally be the same, as will be their spacing from one another. A pair of laterally spaced arms 410 extend forwardly from the housing 408, to mount it for pivotable movement about the shaft 412, and a compound wheel 414, which carries a belt 416 for driving the bank of blades 396, is affixed on the shaft 412 as well.

A curved foot 418 is attached to the housing 408, and is pivotably mounted between the lower ends of a pair of parallel legs 420 of the blade positioning mechanism, which is generally designated by the numeral 422. The mechanism additionally includes a plate 424 to which the upper ends of legs 420 are attached and below which extends a crosspiece 426. A connecting arm 428 extends upwardly from the plate 424 and is joined to a cross-wise handle 430 which is, in turn, connected to a pair of links 432; the links are pivotably mounted to the plate 434 extending laterally between side portions of the main handle 436 of the machine by a pair of tabs 438. A screw 440 extends vertically between the plate 424 and the crosspiece 426 within a sleeve 442, and it has an adjustment knob 444 on its upper end; the screw is adjustable to vary the amount of protrusion of its lower end beyond the crosspiece 426, and a locking member 445 is disposed on the screw adjacent the plate 424 to maintain its position.

Figure 9:
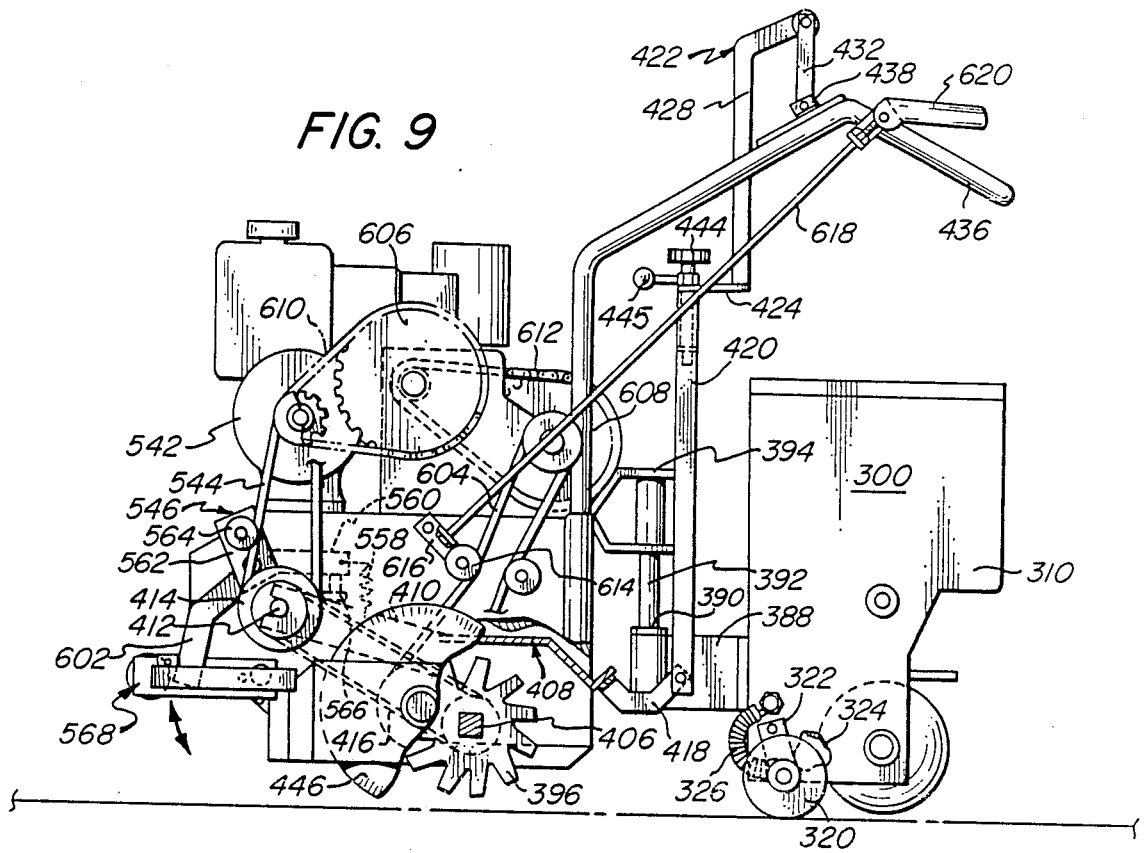
FIG. 9 is an elevational view of the machine of FIG. 8, taken from the right side as shown therein and with portions broken away.
Figure 10:
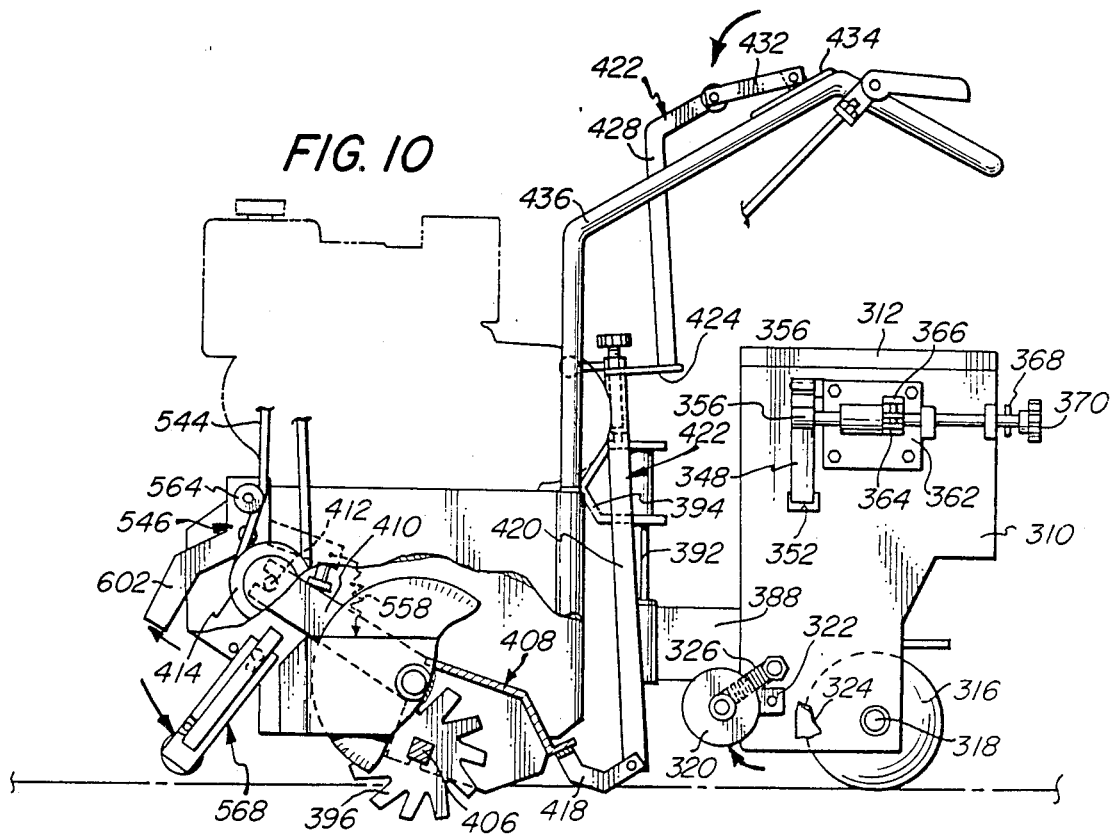
FIG. 10 is a somewhat schematic view, similar to FIG. 9 and showing the cutting blades in lowered, operative position.

As will be appreciated, throwing the handle 430 forwardly from the position shown in FIGS. 8 and 9 to that of FIG. 10 lowers the positioning mechanism 422 and swings the housing 408 and bank of cutter blades 396 downwardly into operative positions. When lowered, the end of the screw 440 lies within a shallow recess in the bracket 394, and its adjustment therefore determines the extent of penetration of the blades 396.

As indicated, the blades are driven from the wheel 414, which is connected to the engine 542 of the machine by a drive belt 544. A clutch device, generally designated by the numeral 546, is pivotably mounted on the chassis, and is biased by a spring 558, attached to one arm 560 thereof, in a clockwise direction (as viewed in FIGS. 9 and 10). A flange 562 attached to the arm 560 carries an idler roller 564, which rides upon the belt 544 and controls its tension; and a foot 566 attached to the opposite end of the arm 560 is disposed to engage upon one of the arms 410 of the blade housing 408. In the elevated position of the housing shown in FIG. 9, the arm 410 maintains the roller 564 in a non-tensioning condition, allowing slippage of the belt 544; when the housing is lowered to the position shown in FIG. 10, the idler 564 bears more tightly upon the belt and creates the tension necessary to effectively transmit a power from the engine for driving of the blades 396.

A latching roll-bar mechanism, generally designated by the numeral 568, is mounted at the front of the chassis, and consists of a pair of arms 570 pivotably supported at 571 by the sidewall portions 572. A cylindrical roller member or roll-bar 574 extends between the arms 570, and a bumper piece 576 curves outwardly from both sides. Forwardly of its pivot point, one of the arms 570 has an aperture 578 in which is mounted a flanged bushing 580. An operating lever 582 is disposed upon the outer end of the bushing 580, and has an inwardly extending finger 584 which engages the lower edge of the arm 570. A detent component extends through the bushing 580, and has a shaft 586 with a knob 588 on one end and a collar 590 adjacent the other. A spring 592 bears upon the collar 590 at one end and upon the inside surface of the operating lever 582 at the other, thereby urging the tip 594 of the shaft into an aperture 596 in the wall portion 572 of the chassis; this engagement maintains the roll-bar mechanism 568 in the elevated position shown in FIGS. 8, 8a and 9. Pulling the detent outwardly to effect disengagement of the tip 594 will permit lowering of the mechanism (as indicated by the arrow in FIG. 8a), and it may thereupon be maintained in an alternative position by reengagement in the aperture 598, as shown in FIG. 10. In its upper position, the latching mechanism prevents the clutch mechanism 546 from effecting engagement of the cutter blades with the engine, regardless of the position of the housing 408, by locking the mechanism against rotation; this results from the engagement of lug 600 on the other of the arms 570 with the leg 602 of the mechanism 546. In its lowered position, the roll-bar serves both as a safety guard and also to stabilize the machine, particularly against tipping forwardly on a downhill course.

The machine is of course propelled by the wheels 446, which are mounted on either side by the shafts 448, supported by the chassis 302 at one end and by the frame members 450 at the other. Each wheel 446 is driven through a belt 604, and the belts are operatively connected to the engine 542 through gears 606, 608 and chains 610, 612. A roller 614 is mounted upon an arm 616, and one such subassembly is pivotably connected to the housing on each side of the chassis; the arms 616 are in turn connected by rods 618 to squeeze handles 620, which are pivoted to the handle 436. As will be appreciated, the rollers 614, control the tension on the belts 604, and thereby the transmission of power from the engine 542 to the wheels 446; since the wheels 446 are individually controlled, steering of the machine is facilitated by selective operation of the levers 620. A throttle control lever 622 is provided on the plate 434 to control ground speed of the machine by conventional means.

Thus, it can be seen that the present invention provides a relatively compact, power-driven lawn seeding machine which is highly maneuverable and efficient in its operation. The machine is capable of functioning as an all-terrain slicer/seeder, which can turn on relatively small radii and can plant a lawn effectively in single-pass operation, covering a relatively wide swath and despite steep inclines. A unique seed depositing unit is also provided.

Having thus described the invention, what claimed is:

1. A power-operated lawn seeding machine comprising, in combination:

a chassis;

laterally spaced ground engaging wheels disposed adjacent opposite sides of said chassis and rotatably mounted thereon;

an engine disposed on said chassis in substantial vertical alignment over said wheels;

first connecting means for operatively connecting said engine for driving said wheels;

a multiplicity of rotary slicing blades arranged as a bank in side-by-side spaced relationship for rotation on a common axis and operatively connected to said engine for driven rotation;

second connecting means for operatively connecting said engine for driving said bank of blades;

means mounting said bank of blades on said chassis, with said axis thereof in parallel alignment with the axis between said wheels, said mounting means enabling movement of said bank of blades, relative to said chassis, between an elevated position with said blades substantially above ground level, and a lowered position for cutting thereinto, said blade bank axis being in substantial vertical alignment under said wheel axis in said lowered position of said mounting means, so as to impose, in coaction with said wheels, a minimum amount of resistance to turning of said machine;

means for selectively adjusting the elevation of said blade mounting means;

handle structure disposed on said chassis rearwardly of said wheels and in an elevated position; and seed delivery means mounted on said chassis rearwardly of said wheels, said delivery means and said chassis having cooperating means for operatively connecting said delivery means to said chassis for free pivotal movement about a generally vertical axis, said delivery means comprising a bank of discs mounted in side-by-side, spaced relationship for rotation on a common axis, the number and spacing of said discs being the same as the number and spacing of said blades, such pivotable mounting adapting said delivery means to enable ground-contacting and automatic tracking engagement of said discs in grooves cut by said blades.

2. The machine of claim 1 wherein said blade bank mounting means enables pivotal movement of said blade bank about an axis parallel to said wheel axis.

3. The machine of claim 2 wherein said second connecting means includes a rotary drive member, said drive member rotating on the axis of pivoting of said blade bank mounting means.

4. The machine of claim 1 wherein said blades are equidistantly spaced from one another on about two-inch centers.

5. The machine of claim 1 additionally including seed supply means operatively connected to said delivery means for the delivery of seed thereto.

6. The machine of claim 5 wherein said supply means and said delivery means are integrated as an assembly, and wherein said assembly is pivotably connected to said chassis by said cooperating means to afford such pivotal movement of said delivery means.

7. The machine of claim 6 wherein said assembly includes a common housing for said supply means and said delivery means, said housing being disposed under said handle structure.

8. The machine of claim 5 wherein said seed supply means comprises a hopper for holding a volume of seed, and a multiplicity of conduits for delivering seed to each of said discs from said hopper.

9. The machine of claim 8 wherein said hopper is fixedly mounted on said chassis and has a multiplicity of outlet openings therefrom, and wherein each of said conduits comprises a flexible tube extending from one of said openings to adjacent one of said discs to define a path for seed flow thereto from said hopper.

10. The machine of claim 9 wherein said seed supply means includes metering means for centralling the rate of flow of seed therefrom, wherein said openings extend along the bottom of said hopper, and wherein said metering means comprises a pair of superposed plates spanning said hopper at a level above said openings and having a supply chamber of said hopper thereabove, said plates having a multiplicity of apertures formed therethrough with said apertures of one of said plates being in general registry with said apertures of the other plate to cooperatively define a multiplicity of passages, said plates being laterally shiftable relative to one another to vary the degree of registry of said apertures and thereby the areas of said passages, to in turn control the flow of seed from said supply chamber to said openings, said machine additionally including means for laterally shifting at least one of said plates.

11. The machine of claim 10 wherein the number of said passages is the same as of said openings, and wherein said passages and openings are vertically aligned with one another.

12. The machine of claim 5 wherein said seed supply means includes metering means for controlling the rate of flow of seed therefrom.

13. The machine of claim 1 additionally including means mounting said bank of discs for movement between an elevated position with said discs substantially above ground level, and a lowered position therebelow.

14. The machine of claim 13 wherein said selective adjusting means for said blades also serves for simultaneously selectively adjusting the elevation of said disc mounting means.

15. The machine of claim 14 wherein said disc mounting means enables pivotal movement of said bank of discs about an axis parallel to said wheel axis.

16. The machine of claim 1 including at least one additional ground-engaging wheel, and means mounting said additional wheel rearwardly of said bank of discs for pivotable movement about a generally vertical axis.

17. A power-operated lawn seeding machine comprising, in combination:
    a chassis;
    laterally spaced ground engaging wheels disposed adjacent opposite sides of said chassis and rotatably mounted thereon;
    an engine disposed on said chassis in substantial vertical alignment over said wheels;
    first connecting means for operatively connecting said engine for driving said wheels;
    a multiplicity of rotary slicing blades arranged as a bank in side-by-side spaced relationship for rotation on a common axis and operatively connected to said engine for driven rotation;
    second connecting means for operatively connecting said engine for driving said bank of blades;
    means mounting said bank of blades on said chassis, with said axis thereof in parallel alignment with the axis between said wheels, said mounting means enabling movement of said bank of blades between an elevated position with said blades substantially above ground level, and a lowered position for cutting thereinto, said blade bank axis being in substantial vertical alignment under said wheel axis in said lowered position of said mounting means, so as to impose, in coaction with said wheels, a minimum amount of resistance to turning of said machine;
    means for selectively adjusting the elevation of said blade mounting means;
    handle structure disposed on said chassis rearwardly of said wheels and in an elevated position;
    an assembly including integrated seed delivery means and seed supply means operatively connected for the delivery of seed to said delivery means; and
    means for pivotably connecting said assembly to said chassis rearwardly of said wheels for free pivotal movement about a generally vertical axis, said delivery means comprising a bank of discs mounted in side relationship for rotation on a common axis, the number and spacing of said discs being the same as the number and spacing of said blades, such pivotable mounting adapting said delivery means to enable ground-contacting and automatic tracking engagement of said discs in grooves cut by said blades.

* * * * *

UNITED STATES PATENT AND TRADEMARK OFFICE
CERTIFICATE OF CORRECTION

PATENT NO. : 4,821,655
DATED : April 18, 1989
INVENTOR(S) : Salvatore J. Rizzo

It is certified that error appears in the above-identified patent and that said Letters Patent is hereby corrected as shown below:

Claim 17, column 14, line 48, add after "in side"

-- -(hyphen) by-side, spaced--

Signed and Sealed this

Tenth Day of July, 1990

Attest:

HARRY F. MANBECK, JR.

*Attesting Officer*     *Commissioner of Patents and Trademarks*